May 6, 1947. O. A. PUTNAM 2,420,012
OPHTHALMIC TEST INSTRUMENT FOR THE OCULAR MUSCLES
Filed July 11, 1944 2 Sheets-Sheet 1
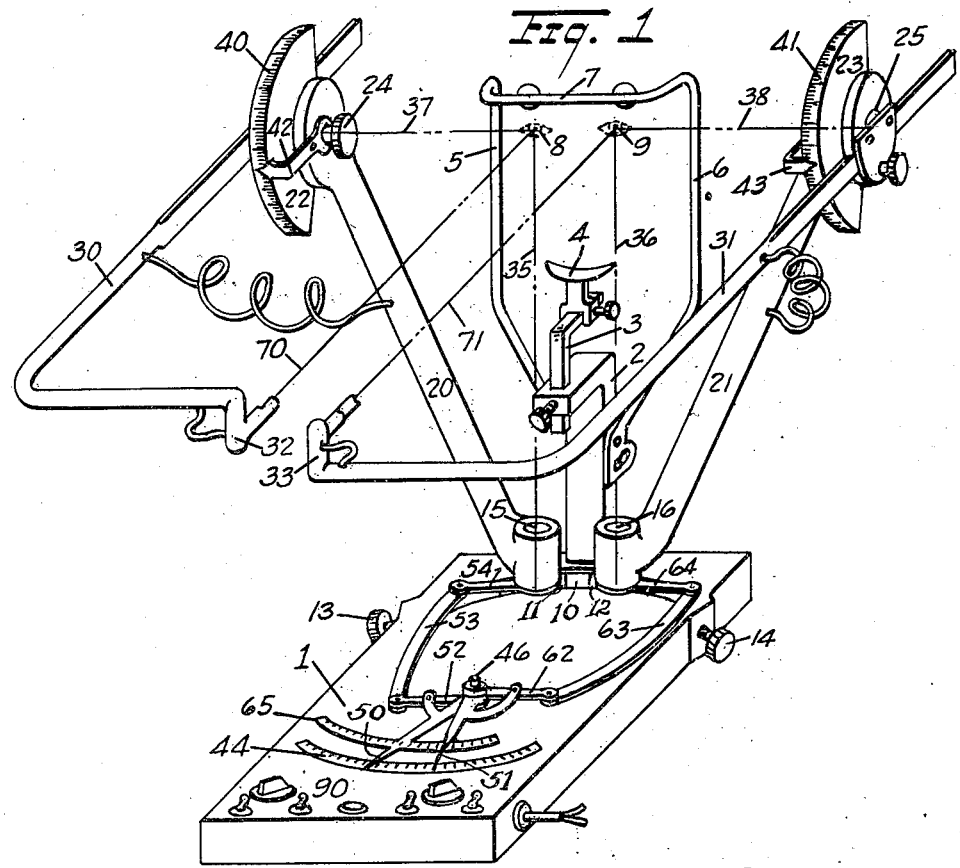
Fig. 1
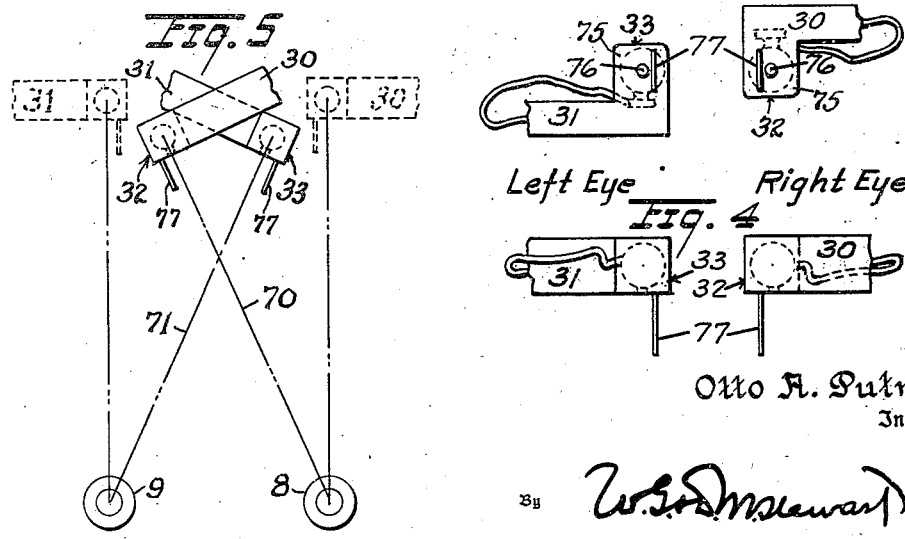
Fig. 3
Fig. 5
Fig. 4
Left Eye Right Eye
Otto A. Putnam
Inventor
By W.G.D.M. Stewart
Attorneys May 6, 1947.   O. A. PUTNAM   2,420,012
OPHTHALMIC TEST INSTRUMENT FOR THE OCULAR MUSCLES
Filed July 11, 1944   2 Sheets-Sheet 2
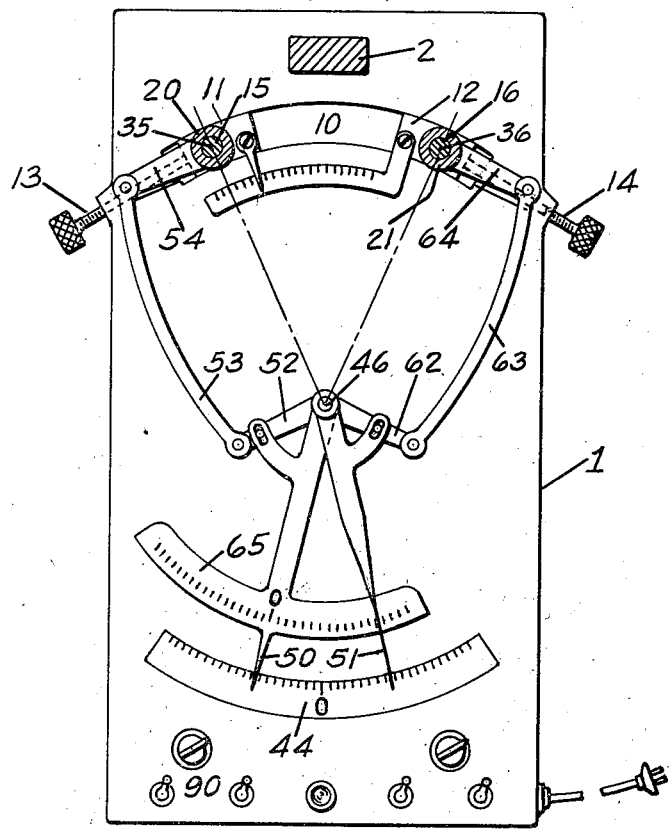
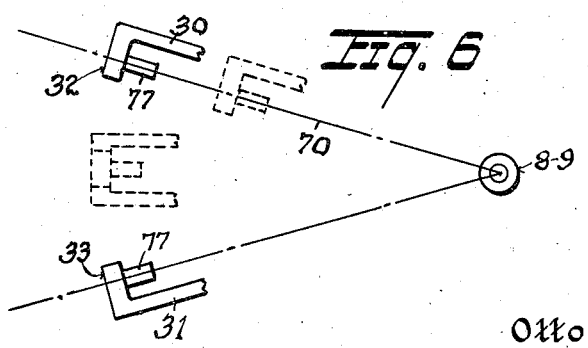
Otto A. Putnam
Inventor
By
Attorneys Patented May 6, 1947

2,420,012

UNITED STATES PATENT OFFICE 2,420,012

OPHTHALMIC TEST INSTRUMENT FOR THE OCULAR MUSCLES

Otto A. Putnam, West Reading, Pa.

Application July 11, 1944, Serial No. 544,394

4 Claims. (Cl. 88—20)

My invention relates generally to ophthalmic instruments for diagnosing faulty vision and more particularly it relates to a device for determining the character and extent of imbalances and abnormalities of the ocular muscles when the eye is viewing in any direction within the field of fixation and at near or distant points of fixation, such abnormalities being, for instance, squint, phoria, and like anomalies of the eye.

Instruments and means heretofore used for tests of this nature have all employed, in one form or another, the interposition into the direct line of sight of prisms and/or mirrors to angularly bend and divert the straight lines of vision in known manner; but said instruments and means heretofore known have limitations in the field of vision and/or in precision. Such instruments and means heretofore known include prisms, stereoscopes, and various modifications of amblyoscopes.

The primary object of my present invention is to produce a testing instrument free of the aforesaid limitations, deficiencies, and errors of all such heretofore known instruments and means, and for this purpose I employ a new and radically different principle that will produce importantly new results with assured accuracy of registered findings throughout the entire field of fixation while fixing on near or distant points, and in a device of simplified construction having a wide scope of usefulness and varied possibilities as will later herein more fully appear.

More specifically, my invention essentially comprises two movable targets, or light sources, one for each eye, each seen solely by its particular eye and viewed in a straight radial line of vision, and each separately mounted to independently travel in a spherical orbit having its center of rotation coincident with the center of rotation of its respective eye, and freely movable thereabout in all directions within the field of fixation without interference or confusion of its separate visibility, and such target movement being desirably connected to appropriately calibrated scales to indicate and register the direction of the visual line from its particular eye.

In the accompanying drawings,

Fig. 1 is a diagrammatic perspective elevation of a testing instrument, indicating a preferred embodiment of my invention, the view being taken from the examiner's position looking towards the eyes to be examined, and the scale indicating pointers being shown as distorted from a true registering position, so as to more fully disclose their dual mounting.

Fig. 2 is a diagrammatic plan view, on an enlarged scale, of the base platform of the instrument, with the post and arms extending upwardly therefrom sectionally cut away in a horizontal plane above said base.

Fig. 3 is a separate enlarged diagrammatic view of the pair of targets indicated in Fig. 1, shown in front elevation as seen by the eyes being tested.

Fig. 4 is a corresponding plan view of the same.

Fig. 5 is a diagrammatic plan view indicating possible angular horizontal deviations of the targets relative to the eyes.

Fig. 6 is a corresponding diagrammatic side view indicating possible angular vertical deviations of the targets relative to the eyes.

Referring particularly to a preferred embodiment of my invention, shown diagrammatically in the accompanying drawings as best disclosing my improved testing instrument, and in which like reference numerals refer throughout to the same parts, 1 represents a base platform, 2 a fixed post rising therefrom, with an angle bracket 3 vertically movable therein, and carrying a horizontally shiftable chin rest 4, shown with locking screws to hold the movable parts in adjusted position relative to an open frame having its side bars 5 and 6 adjustably fixed to post 2, and its top cross bar 7 adapted to form a forehead rest, acting with chin rest 4 to locate and fixedly position the eyes to be tested, 8 indicating the right eye and 9 the left eye. Obviously any other head supporting frame with equivalent means for locating and holding the eyes in testing position might be substituted.

A recess 10 shown in platform 1, forms a bearing slide way for a pair of slide blocks 11 and 12, positioned therein as by their respective adjusting screws 13 and 14, and each block having a vertically extending bearing post, 15 and 16 respectively, forming pivot supports for a pair of upright arms, 20 and 21 respectively, having their lower ends rotatably mounted on said posts and their offset inclined upwardly projecting ends adapted to pivotally carry vertically disposed disk segments, 22 and 23 respectively, on horizontal pivot bearings 24 and 25 respectively. And each segment, 22 and 23, as shown, carries a target-supporting arm, 30 and 31 respectively, securable in varying lengthwise projection, and its preferably angularly bent outer end adapted to fixedly support one of a pair of targets, or light sources, indicated generally by reference numerals 32 and 33 respectively.

The essential features of the above described embodiment are: That the pivotal axes for arms 20 and 21, their posts 15 and 16, as by adjustments of the screws 13 and 14, and of the head supporting frame, must be laterally spreadable to the pupilary distance of the eyes being tested, and be locatable directly below the latter, so that vertical projections of their respective axes, indicated by dot-and-dash lines 35 and 36, may be made to pass vertically through the centers of rotation of their respective eyes 8 and 9. And that horizontal pivot bearings 24 and 25, also as by adjustment of the head supporting frame, must be locatedly positionable so that axial projections of their respective pivots will lie in horizontal planes at right angles to the aforesaid vertical axes, 35 and 36, and coincide and pass horizontally through the centers of rotation of their respective eyes 8 and 9, as indicated by dot-and-dash lines 37 and 38. The targets 32 and 33, preferably sources of light rays, may be set at any distance from the eyes, but are so directed as to be clearly visible to the latter and send their rays along a line extending radially from their respective eyes.

As above described, and in accordance with my invention, targets 32 and 33, irrespective of their spaced distance from their respective eyes, will each swing horizontally on its vertical axes, 35 or 36, and will also swing vertically on its horizontal axes, 37 or 38. And as axes 35 and 37 intersect at a point substantially coincident with the center of rotation of eye 8, and similarly axes 36 and 38 intersect at a point substantially coincident with the center of rotation of eye 9, each moving target, 32 or 33, will describe a sphere, and traverse in its independent orbit having its particular center of rotation substantially coincident with the center of rotation of its respective eye. The arms 20 and 21 and the disk segments 22 and 23 are free to pivot for accurate positioning of the targets, but should preferably remain in adjusted position when set, which may be secured by any usual frictional pivotal mounting and/or counterbalancing means, found necessary but not indicated as readily understood without any showing. By the aforesaid means it will be readily understood that I accomplish a hereinbefore stated essential object of my invention, that is the traverse of each target in an independent spherical orbit substantially concentric to its respective eye.

To individually indicate the vertical movement of the targets 32 and 33 about their horizontal axes, 37 and 38 respectively, the arcuate face of each disk segment 22 and 23 is shown provided with an appropriately calibrated scale, 40 and 41 respectively, and each arm 20 and 21 may fixedly carry a pointer 42 and 43 respectively as shown, set to indicate a scale reading, as zero, when the targets 32 and 33 each are positioned in a true horizontal plane relative to the centers of rotation of their respective eyes 8 and 9. Movement of either target 32 or 33 above or below a true horizontal plane of vision of its particular eye may thus be seen and measured, as will be readily understood.

To measure the lateral movements of targets 32 and 33 about their respective vertical axes 35 and 36 from one side or another relative to parallel vertical planes passing through the centers of rotation of their respective eyes, 8 and 9, and extending straight forward in a direction to contain the visual lines in the normal eyes-front position, the drawings show an arcuate scale 44 on platform 1, and a concentric pivotal mounting 46 for independent superimposed pointers 50 and 51 indicating the lateral movements of targets 32 and 33 respectively. The platform recess 10, in the particular embodiment of the drawings is shown as curved in an arc concentric with the common pivotal mounting 46. The rotary movement of arm 20 is carried to its pointer 50, as by a lever 52 forming an adjustably fixed bell-crank extension of pointer 50, connected by a link bar 53, preferably curved as shown, to a lever 54 forming a bell-crank extension for arm 20. By adjusting the angle between pointer 50 and lever 52 until pointer 50 is parallel to the vertical plane containing the line of vision indicated by dot-and-dash line 70, the pointer 50 will continue to indicate the lateral direction of the visual line 70 for eye 8, as lever 52 is shown radially equal in length to lever 54 and the pivot length of link 53 is shown equal in length to a radial arc inscribed about post 46 and passing through the center of post 15, thus keeping lever 52 parallel to lever 54, which in turn maintains pointer 50 parallel to a vertical plane containing the visual line 70 throughout all movements of target 32 irrespective of any adjustments of sliding block 11 in recess 10. In like manner through levers 62 and 64 and connecting link 63, pointer 51 indicates the lateral component of visual line 71 for eye 9. Pointer 50 may bear, as shown, a differential scale 65 on which pointer 51 will indicate directly the lateral deviations between the visual lines of the eyes when viewing their respective targets.

Should the supporting pivots of arms 15 and 16 be separable by any other method than that shown, for instance as by travel in a straight recess, or by mounting on levers, they may be respectively linked to pointers 50 and 51 as through known two connected four-bar linkages, not shown, or by some other method, the particular nature of the connecting mechanism being immaterial so long as pointers 50 and 51 indicate the lateral movements of targets 32 and 33.

The targets 32 and 33, as previously stated may be of any suitable nature but are shown as preferably sources of light and may carry a small object such as a fine line or wire, or two dots, to obtain sharp depth of focus of the fixing eye, and are adapted to project their rays directly towards their eyes along straight, undeviated lines of vision extending radially from the centers of rotation of their respective eyes 8 and 9, as indicated by the aforesaid dot-and-dash lines 70 and 71 in the drawings. The reflected light of such rays on the cornea of each eye may be clearly seen by the examiner at all times, even in a lighted room, and is useful in permitting the examiner to be sure the patient is fixing properly, and is also helpful in permitting the examiner to approximate the proper position for the targets and thus reduce subsequent screening, as well as being useful in objective tests of small children. Further these light sources are preferably placed within an opaque casing 75 with a suitable hole or slit, 76, therein directing the light toward their respective eyes and are shown with a shield extension 77 limiting vision of each target ray to its particular eye in any position of the target. The light shields 77 are shown as immediately adjacent to their respective target openings 76 and are on the nasal side of the latter. Thus the shield 77 for the target 32 as seen by the right eye 8, is immediately on the left side of its target opening 76, and the similar shield 77 for target opening 76 seen by the left eye 9, is immediately on the right of said opening. The width of the target opening and the length of the light shield, as shown, are so related that all parts of each target opening are hidden from view by the other eye, but always visible to its own particular eye.

To provide for freedom of movement of the targets 32 and 33 in all directions, including crossing one another when required, and for any degree of vertical adjustments without interfering with one another, or obstructing the sole visibility of each target by its particular eye, the drawing show arm 30 as slidably mounted in its segment 22 above its horizontal pivot bearing 24, and arm 31 as slidably mounted in its segment 23 below its horizontal pivot bearing 25, permitting said arms to cross one another as may be required. And with the above construction, in order to aline each target 32 and 33 in a true radial line of projection from its pivotal axis, 24 and 25 respectively, casing 75 for target 32 is shown as mounted below the outer end of its carrying arm 30, and similar casing for target 33 is shown as mounted above the outer end of its carrying arm 31. With this construction, and by varying their radial projection, the arms 30 and 31 may be moved without interfering with one another; and if vertical deviation is sufficient, the arms may have equal radial projection. Such change of radial projection of either targets does not change the angular direction nor effect the scale readings, as the targets 32 and 33 then merely travel in spherical orbits of different diameter. The effect of crossing the targets without interfering with their separate vision by their respective eyes is more fully disclosed diagrammatically in Figs. 5 and 6.

In place of the shields 77 aforesaid, separate vision of each target may be secured by other means, not necessary to show in the drawings. For instance, a polarized screen and filter may be introduced into the line of vision of one target, with a filter and screen of a different polarization introduced into the line of vision of the other target, thus limiting vision of each eye to its own particular target in a manner wellknown and readily understood. Or separate vision of the targets may be secured chromatically by the use of a filter and screen for one target differing in color from a filter and screen for the other target. And any means that will limit the vision of each eye to its particular target may be used.

Desirable regulation of the light rays may be secured by switches and rheostats positioned for convenient manipulation of the examiner, indicated in Fig. 1 by general reference numeral 90, by means of which the on and off, intensity, and intermittent flashing, of one or both targets may be readily controlled. In this case it will be understood the lights in both targets are in an electrical circuit including said switches and rheostats, and with a source of supply, not shown in the drawings, but of any usual construction and readily understood.

From the foregoing description it will readily be understood that with the instrument set to the correct pupilary distance and the eyes positioned in their proper testing location, the targets 32 and 33 will each travel in a spherical orbit substantially concentric with its respective eye 8 and 9, and that changing the radial distance of either target by adjusting the lengths of target supporting arms 30 and/or 31 along a line parallel to the visual lines 70 and 71 respectively, will merely change the radius of its sphere of movement without disturbing the directional relationship with respect to vertical or horizontal deviations from the eyes front or the scale readings thereof.

In the operation of my instrument improved results may be obtained, as will be readily apparent to one skilled in testing eyes, as one target may be moved relative to the other in any field of binocular fixation until they appear superimposed to the tested eyes. Deviations of the eyes in the vertical direction are obtained by taking the difference of the two vertical readings of the target positions. Horizontal or lateral deviations are indicated on the differential scale. For near points of fixation a geometrical converging factor is applied to the lateral deviation. Plotting results as a graph furnishes a means of obtaining results of higher prevision than any heretofore known method for determining the direction and degree of muscular abnormalities to aid diagnosis as to needed corrective treatment or surgical correction. Near points of fixation are obtained by adjusting the fixing target to a distance of approximately fifteen inches from the eye, while deviations at distance fixations are obtained by alining the target with some object, say a test letter, spaced at approximately twenty feet. The vertical and horizontal direction of the distant object having been determined, the alining target is moved out of view and while fixing it with one eye the target for the other is moved until by subjective methods or objective observation with a usual cover test it is determined to be superimposed on the distant target.

My instrument may be used subjectively in a variety of known tests, viz: As with a known screen parallax test, best made in a darkened room, with a light cover alternately held before each eye, or by alternate flashing of each target light; and with colored glass held before the eyes to make the target for that eye appear a different color from the other.

Objectively my instrument may be used as with a cover passed from eye to eye and observance by the examiner of any eye movement at the moment it is uncovered, and this test may be carried out in all the cardinal directions, and in a lighted room which is a feature of outstanding usefulness. The use by reading the reflection in the cornea has been previously mentioned as useful with small children and as a quick method of approximating the correct position which serves as an excellent starting position for the final screen tests.

Other tests than those above briefly outlined may be made by my instrument or will suggest themselves to an experienced examiner. It is further possible that one skilled in testing and exercising the eyes can, after diagnosis of any muscular irregularities, use my instrument with suitable targets in a manner to exercise ocular muscles defective in a manner correctable in whole or in part by such exercise.

In the particular embodiment of my invention, as above fully described, the bearing pivots 15 and 24 for arm 30, and bearing pivots 16 and 25 for arm 31 are set forth as having their centers respectively on vertical and horizontal axial lines intersecting substantially at the centers of rotation of their respective eyes 8 and 9, to provide for the traverse of their respective targets 32 and 33 in independent spherical orbits each substantially concentric to its particular eye. To secure this spherical traverse of the targets, it will be readily understood, that said bearing points need not necessarily lie in said vertical and horizontal axial lines, as the same target movements may be secured in other positions of said bearing pivots so long as the axial lines of projection of their centers of rotation for each target lie at right angles to one another and intersect substantially at the centers of rotation of their respective eyes. With this understanding it will be apparent my invention may be implemented in other and varying manner, and I do not wish to limit myself to the particular construction above fully described, but wish to include such changes and modifications as may be developed within the scope of my invention as defined in the following claims.

What I claim is:

1. An ophthalmic instrument of the character described pertaining to directional functionings of the ocular muscles, comprising a fixed base member, a head-engaging frame mounted on said base for positioning a pair of eyes in free forwardly viewing position, a pair of viewable targets for said eyes, shielding means associated with each of said targets limiting viewing of each solely to its respective eye, separate carrier arms for the respective targets for spacedly positioning each in free open view in a direct radial line of vision before its particular eye, separate supporting members for the respective carrier arms mounted on said base and each having two pivotal bearings of rotation at right angles to one another with the projected axes thereof intersecting at the centers of rotation of their respective eyes for moving each target to any position of view in a spherical orbit concentric with its said center of eye rotation, and means for indicating the angular directions of the separate radial line of vision from each eye to its particular target.

2. In the construction set forth in claim 1, means for relatively adjusting said carrier arms for free movement of their targets into viewing positions by their respective eyes in any angular crossing of said direct radial lines of vision.

3. An ophthalmic instrument of the character described pertaining to directional functionings of the ocular muscles, comprising a fixed base member, a frame adjustably mounted on said base for positioning a pair of eyes in free forwardly viewing position, a pair of vertically extending posts having pivotal bearings mounted on said base, adjustable means for spacing said bearings to the pupilary spread of said eyes with the projected vertical axis of rotation of each bearing intersecting the center of rotation of its respective eye, a forwardly projecting target-carrying arm pivotally mounted at the upper end of each post with its projected axis of rotation extending at right angles to the vertical axis of rotation of its post and intersecting the latter at the same eye center of rotation, a viewable target mounted at the forward end of each carrying arm in free open view in a direct radial line of vision at a spaced distance from its respective eye, means for varying the forward projection of each carrying arm to adjustably vary the spaced distance of its target from its eye, shield means on the nasal side of each target for limiting view thereof to its particular eye, and graduated scales having indicator pointers cooperatively actuated by the rotation of said posts and carrier arms for determining the angular directions of radial lines of vision of each eye to its particular target.

4. An ophthalmic instrument pertaining to the directional functionings of the ocular muscles, comprising a base member having a head rest for positioning a pair of eyes in free forwardly-looking testing position, a pair of directly viewable targets each separately swingable in open radially spaced relation before its respective eye and each having shielding means associated therewith for limiting viewing of each solely to its respective eye, and a pair of bearings on said base each pivotally carrying a supporting arm for its respective target for swinging the latter in an independent spherical orbit concentric with its respective eye, each of said supporting arms comprising pivotally connected sections with one section thereof pivotally mounted on its respective base bearing to rotate about an axis intersecting substantially the center of rotation of its respective eye, and an outer target-carrying section pivotally movable about a second axis at right angles to the axis of its base bearing and intersecting the latter at a point substantially coincident with the same respective eye center of rotation, said supporting arms adjustably carrying their targets in non-conflicting paths of spherical traverse into any overlapping relation of their separate orbits in crossing radial lines of vision, and indicating means cooperatively actuated by said arm movements for showing the position of each target relative to its respective eye.

OTTO A. PUTNAM.

REFERENCES CITED

The following references are of record in the file of this patent:

UNITED STATES PATENTS

| Number | Name | Date |
|---|---|---|
| 2,380,850 | Krimsky | July 31, 1945 |
| 2,063,015 | Ames, Jr. | Dec. 8, 1936 |
| 2,147,957 | Ames, Jr. | Feb. 21, 1939 |
| 2,362,857 | Renshaw | Nov. 14, 1944 |
| 2,316,139 | Wottring | Apr. 6, 1943 |
| 785,439 | Sayen | Mar. 21, 1905 |
| 1,960,111 | Kirk | May 22, 1934 |
| 1,464,075 | Hull | Aug. 7, 1923 |

FOREIGN PATENTS

| Number | Country | Date |
|---|---|---|
| 354,999 | Br. | Aug. 20, 1931 |